United States Patent
Eggink et al.

(10) Patent No.: US 9,965,443 B2
(45) Date of Patent: May 8, 2018

(54) METHOD FOR DETERMINING A SENTIMENT FROM A TEXT

(75) Inventors: Jana Eggink, London (GB); Thomas Kemp, Esslingen am Neckar (DE); Niko Schenk, Gaertringen (DE); Daniel Duran, Esslingen am Neckar (DE)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 14/111,101

(22) PCT Filed: Mar. 12, 2012

(86) PCT No.: PCT/EP2012/001102
§ 371 (c)(1),
(2), (4) Date: Jan. 3, 2014

(87) PCT Pub. No.: WO2012/143069
PCT Pub. Date: Oct. 26, 2012

(65) Prior Publication Data
US 2014/0114648 A1 Apr. 24, 2014

(30) Foreign Application Priority Data
Apr. 21, 2011 (EP) .................................... 11003379

(51) Int. Cl.
*G06F 17/27* (2006.01)
*G06F 17/21* (2006.01)

(52) U.S. Cl.
CPC ............ *G06F 17/21* (2013.01); *G06F 17/274* (2013.01); *G06F 17/2785* (2013.01); *G06F 17/2755* (2013.01)

(58) Field of Classification Search
CPC ............................ G06F 17/2785; G06F 17/274
USPC .............................................................. 704/9
See application file for complete search history.

(56) References Cited

U.S. PATENT DOCUMENTS

| 6,622,140 | B1 |   | 9/2003  | Kantrowitz |              |
|-----------|----|---|---------|------------|--------------|
| 7,289,949 | B2 | * | 10/2007 | Warner     | G06F 17/271  |
|           |    |   |         |            | 704/9        |
| 8,200,477 | B2 | * | 6/2012  | Yi         | G06F 17/2715 |
|           |    |   |         |            | 704/1        |
| 8,554,701 | B1 | * | 10/2013 | Dillard    | G06N 99/005  |
|           |    |   |         |            | 706/12       |

(Continued)

FOREIGN PATENT DOCUMENTS

| CN | 101609459 A | 12/2009 |
| CN | 101887414 A | 11/2010 |
| WO | 2009 007181 | 1/2009  |

OTHER PUBLICATIONS

Qiu, J. et al. "News Recommender System Based on Topic Detection and Tracking", Rough Sets and Knowledge Technology, Springer Berlin Heidelberg, pp. 690-697, XP019124192, (Jul. 2009).

(Continued)

*Primary Examiner* — Vu B Hang
(74) *Attorney, Agent, or Firm* — Oblon, McClelland, Maier & Neustadt, L.L.P.

(57) ABSTRACT

A method for determining a sentiment, including determining, from a text including formatting information related to parts of the text, a sentiment expressed by at least one of the parts, wherein the sentiment is determined automatically using a microprocessor and depends on formatting information related to the at least one of the parts.

16 Claims, 9 Drawing Sheets

(56) References Cited

U.S. PATENT DOCUMENTS

| | | | |
|---|---|---|---|
| 2002/0110248 A1* | 8/2002 | Kovales | G10L 13/00 381/56 |
| 2004/0001090 A1 | 1/2004 | Brown et al. | |
| 2006/0095251 A1 | 5/2006 | Shaw | |
| 2007/0208569 A1* | 9/2007 | Subramanian et al. | 704/270 |
| 2009/0019356 A1 | 1/2009 | Deyab et al. | |
| 2009/0083052 A1* | 3/2009 | Bokor | G06Q 30/06 705/1.1 |
| 2009/0216524 A1* | 8/2009 | Skubacz et al. | 704/9 |
| 2010/0250554 A1 | 9/2010 | Shu | |
| 2010/0257022 A1* | 10/2010 | Wang et al. | 705/10 |
| 2011/0288897 A1* | 11/2011 | Erhart et al. | 705/7.13 |
| 2012/0245924 A1* | 9/2012 | Brun | G06F 17/2765 704/9 |

OTHER PUBLICATIONS

Mabrook, O. et al., "Topic Detection and Tracking Interface with Named Entities Approach", Semantic Technology and Information Retrieval (STAIR), pp. 215-219, XP032038287, (Jun. 2011).

Neviarouskaya, A. "Analysis of Affect Expressed through the Evolving Language of Online Communication", IUI 07, Jan. 28-31, 2007, ( Total 4 Pages).

International Search Report dated Aug. 4, 2012 in PCT/EP12/001102 Filed Mar. 12, 2012.

German Office Action dated Dec. 5, 2014 in Patent Application No. 11 2012 001 794.3 (without English Translation).

Dimitrios Tsonos et al., "A Methodology for the Extraction of Reader's Emotional State Triggered from Text Typography", Tools in Artificial Intelligence, 2008, 17 pages.

Georgios Kouroupetroglou et al., "DocEmoX: A System for the Typography-Derived Emotional Annotation of Documents", Universal Access in Human-Computer Interaction. Applications and Services, 2009, 9 pages.

Combined Office Action and Search Report dated Jul. 2, 2015 in Chinese Patent Application No. 201280019285.2 (with English Translation of Category of Cited Documents).

* cited by examiner

Product Evaluation – Subject: Camera Model XYZ

Published by "Anonymous Camera Tester" — 700

Outer Appearance:

+ nice (casing and bag)
- casing is easily scratched — 702

Operation Keys:

+ easy to find and operate
+ audio support after operation ("click")
- arrow keys may be difficult to operate for persons not used to it — 704

Display:

+ large
+ good color reproduction
- cannot be switched off, large energy consumption — 706

→ High class product, but worth the money you have to spend!

Fig. 7

Evaluation Result – Topic: Laptop XYZ — 800

Customer Reviews on German site of Vendor ABC:

- Keyboard: positive (10)
- Battery: negative (8)
- Cover
    - negative - easily scratched (6)
    - positive - pretty (5)
- Fan
    - negative - always on (7)
    - positive - quiet (8)

— 802

Customer Reviews on Japanese site of Vendor DEF:

- Keyboard: positive (6)
            negative (8)
- Battery: negative (28)
- Cover
    - positive - pretty (11)
- Fan
    - negative - always on (8)
    - positive - quiet (7)

Fig. 8

METHOD FOR DETERMINING A SENTIMENT FROM A TEXT

CROSS-REFERENCE TO RELATED APPLICATIONS

The present application claims priority of EP patent application No. 11 003 379.2 filed on Apr. 21, 2011, the entire contents of which are incorporated herein by reference.

An embodiment of the invention relates to a method for determining a sentiment from a text including formatting information. Further embodiments of the invention relate to a device for determining a sentiment from text documents including formatting information, which have e.g. been published within an electronic network.

BACKGROUND

Nowadays, a large amount of text data is electronically accessible, e.g. published within large networks such as the internet. For example, authors publish their personal opinions with respect to various topics on their web sites, in user blogs, newsgroups and chat rooms. This information may be of interest for various purposes, such as evaluating a public opinion with respect to a certain topic.

For analyzing text data, it is important to efficiently evaluate a content of the text data, e.g. for determining a respective topic and for evaluating the author's opinion with respect to this topic. It is, however, often very difficult and tedious to identify the topic and the author's opinion and feeling with respect to the topic by analyzing a semantic content of the text data. Thus, there is a need for a method for quickly and accurately identifying important passages of the text with respect to the topic and to the author's opinion to this topic.

It is an object of the invention to provide a method and device for quickly and accurately determining a sentiment of the author expressed within a part of a text, and further for analyzing a large amount of texts with respect to the sentiments expressed by the authors.

This object is solved by a method and a device according to the independent claims.

Further details of the invention will become apparent from the consideration of the drawings and the ensuing description.

BRIEF DESCRIPTION OF THE SEVERAL VIEWS OF THE DRAWINGS

The accompanying drawings are included to provide a further understanding of embodiments and are incorporated in and constitute part of this specification. The drawings illustrate embodiments, and together with the description serve to explain principles of the embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 7 illustrates the product evaluation published on a website from which sentiments can be analyzed and related to topics by using formatting information.

FIG. 8 illustrates an evaluation result of a sentiment analysis performed for different websites including user opinions with respect to a predetermined topic.

DETAILED DESCRIPTION

In the following, embodiments of the invention are described. It is important to note that all described embodiments may be combined in any way, i.e. there is no limitation that certain described embodiments may not be combined with others. Further, it should be noted that same reference signs throughout the Figures denote same or similar elements.

It is further to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
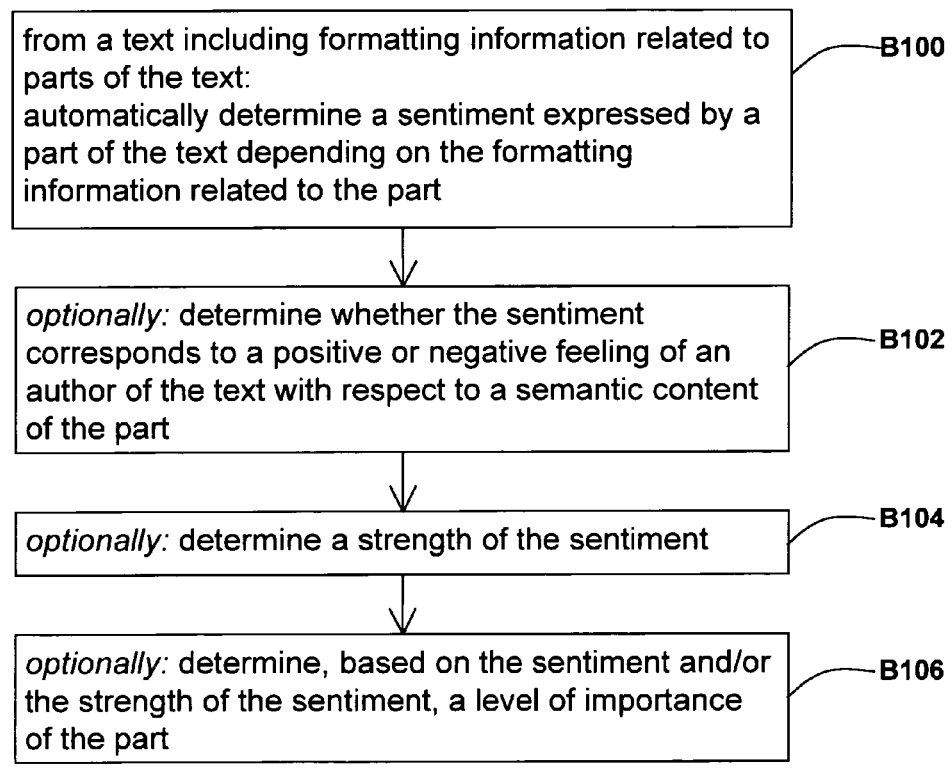
FIG. 1 illustrates an embodiment of a method for determining a sentiment.

In FIG. 1, an embodiment of a method for determining a sentiment is illustrated, including determining, from a text including formatting information related to parts of the text, a sentiment expressed by at least one of the parts, wherein the sentiment is determined automatically using a microprocessor and depends on the formatting information related to the at least one of the parts.

At B100, a sentiment is automatically determined from the text by using the microprocessor. The text is supposed to include the formatting information, which is supposed to relate to parts of the text, e.g. to single characters of the text, to words, phrases, sentences, paragraphs, pages or the like. The sentiment expressed by at least one of the parts is determined depending on the formatting information related to this part.

The text may be any kind of text that may be automatically analyzed by using a microprocessor. For example, the text may be published on a website, or may be saved in form of a document at a server, in a database or in any other device having a storage accessible for the method. For example, the storage may be accessible via an electronic network, such as the internet.

The sentiment expressed by the part of the text may correspond to an attitude of the author towards a semantic content or meaning of the part of text, e.g. an opinion of the author uttered within the part of text or a regard of the author with respect to a topic of the part of the text. It may further correspond to a mental feeling or emotion the author might have had when writing the part of text. The sentiment may thus correspond to an exhibition or manifestation of a personal feeling or sensibility of the author expressed within the part of text.

Since it is to be assumed that the real thoughts the author has had when writing the text may not be read from the text, it is to be understood that the sentiment corresponds to the thoughts or feelings intended to be conveyed by the words or phrases used within the text. Thus, the sentiment may correspond to a feeling, e.g. positive or negative opinion, the author wanted to express and transport to the reader when writing the text.

The text may include various kinds of formatting information relating to parts of the text. For example, the formatting information may be related to characters of the text, for example as a capitalization, an underlining, an italic printing, a color, a font style or a font size of the characters.

The color of characters may, for example, also be evaluated as a basis for determining the sentiment. Characters, words or phrases having a different color from the rest of the text of may be regarded as having a high probability of including a personal opinion and may thus have a high importance for determining the sentiment expressed within the corresponding part of the text. Further, the color itself may express a sentiment. For example, the colors red, yellow and green may be used as in a traffic light scheme for bad, ok, and good, respectively. Further, any color may be adapted to be used for highlighting a part of the text of particular importance. Particular colors, such as red, are further known for highlighting important passages.

Further, the formatting information may be expressed by the characters themselves, e.g. by punctuation characters, such as dots, single or multiple exclamation marks. The formatting information may also include sequences of characters having an illustrating effect, such as a smiling face expressed by a colon followed by a dash and a right parenthesis, thus forming a smiling face ":-)" known as an "emoticon". The characters forming part of the formatting information may also include abbreviations expressing e.g. sentiments, such as "lol" (laughing out loudly), "rofl" (rolling over the floor laughing) or "wtf" (what the fuck). Further abbreviations, marking a personal opinion such as "IMHO" (in my humble opinion) or "just my two cents" may also be analyzed.

The formatting information may also be related to itemization characters. For example, "+" or "−" may be used for marking items as positive or negative.

Also symbols used within the text may be analyzed as formatting information, such as (+) or (−) expressing a positive or negative opinion of the author. If, however, the symbols appear isolated in the middle of running text, they may have another meaning, e.g. as a mathematical symbol or a simple dash separating parts of a long word.

As pointed out in the above, the formatting information may also relate to entire phrases, sentences, paragraphs or passages of the text. For example, the fact that a paragraph has a different format compared to the rest of the text, e.g. a larger indentation or larger left and/or right margin, can indicate an augmented importance of the paragraph and potentially an expression of sentiment within the paragraph.

When analyzing the text, the formatting information may also be used for evaluating and assessing an organization of paragraphs, for example for identifying paragraphs of a higher importance, e.g. expressing an overall opinion of the author. For example, a concluding paragraph may be more relevant with respect to an expression of sentiment of the author than an introductory paragraph.

When analyzing paragraphs, an itemization of the paragraphs may be assessed. For example, it may be assumed that an itemization list may include items that may be regarded as similar or that may have semantic similarities. Further, an introducing phrase may be of interest. The introducing phrase may relate to all of the items, such as the phrase "List of features existing or lacking in product X:" at the beginning of an itemization list.

A sentiment or an opinion uttered at the beginning of a list may be applicable to all of the listed items. For example, when analyzing the lists "nice product features are: A, B, C. Bad product features are: X, Y, Z.", the positive sentiment of "nice features" applies to A, B, and C, while X, Y, and Z are all identified as bad features. Thus, a correct analysis of the items of the list is only possible when relating the introductory phrases to all of the items.

The analysis of the formatting information, e.g. as described in the above, may for example be used for identifying, in a first step, the most important passages of the text which is to be analyzed. In a second step, a semantic content of the passages thus identified may be determined. In a third step, the semantic content may, again, be evaluated in the light of the formatting.

For example, if a paragraph formatting has been analyzed for identifying a paragraph of high importance in the first step, the semantic content or topic of the paragraph may be determined in the second step, and the sentiment the author wanted to express within the paragraph may be further analyzed in a third step, e.g. with respect to colors used within the paragraph. For example, if the colors red, green and yellow are used within the paragraph, the semantic content of a part formatted in red may be assumed to be critical or negative, while a semantic content formatted in green may be assumed to be acceptable, uncritical or positive.

It is thus possible, as illustrated at B102, to additionally determine whether the sentiment corresponds to a positive or a negative feeling of an author of the text with respect to the semantic content of the at least one part of the text. For example, a green color, a smiley or an itemization symbol "+" may be a sign for a positive feeling, while the color red, an angry or sad smiley or the symbol "−" may be an indication of a negative feeling.

At B104, a strength of the sentiment may further be determined.

The strength of the sentiment may, for example, be derived from the formatting information. For example, it may be assumed that a text written in underlined capitals is meant to express a strong sentiment. Correspondingly, also a use of a striking color or font size, or the use of repeated punctuation characters such as in "!!!" may be a sign for a strong sentiment. It may be assumed that parts of the text carrying a strong sentiment may be of particular interest for a reader or someone who is analyzing the text with respect to its content.

At B106, a level of importance of the part of the text may be determined based on the sentiment and/or the strength of the sentiment.

As outlined in the above, parts carrying a sentiment or even a strong sentiment may be of higher importance for the reader than parts which do not carry any sentiment. Thus, a sentiment analysis based on formatting information may help to identify important passages in a quick and efficient manner. For example, based on the level of importance, a semantic analysis may be firstly carried out for the most important parts of the text, and only if needed for the rest of the text.

Figure 2:
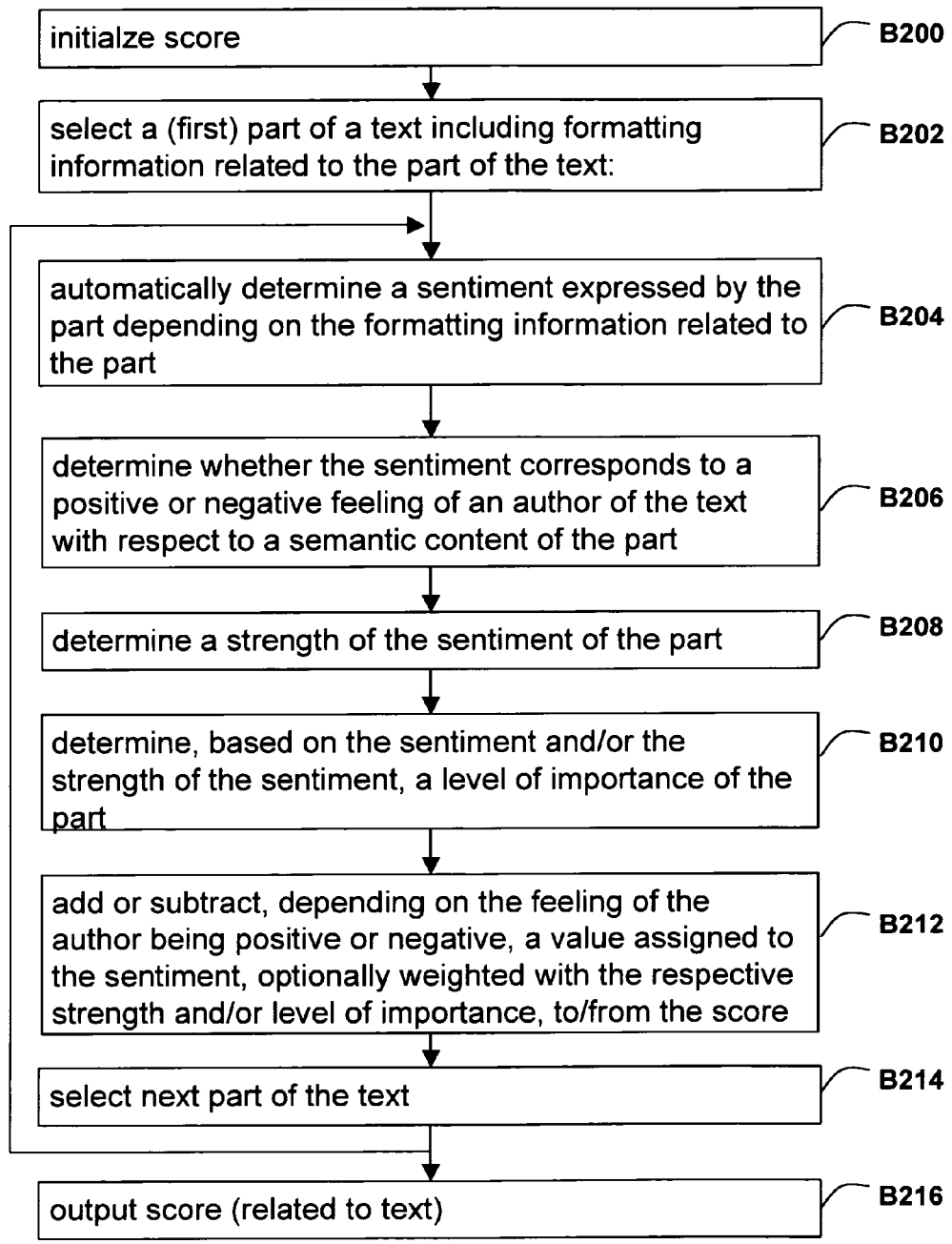
FIG. 2 illustrates a further embodiment of a method for determining a sentiment, wherein a score related to a text is output.

In FIG. 2, a further embodiment of the method for determining a sentiment is illustrated. In this embodiment, for each of a plurality of the parts of the text, a respective sentiment and/or a respective level of importance is determined. Further, a score is determined depending on values assigned to the respective sentiments of each of the plurality of parts of the text. Accordingly, an overall output score related to the text is determined.

At B200, the score is initialized, e.g. set to zero.

At B202, a first part of the text is selected as the part to be analyzed, and is analyzed with respect to the formatting information related to the part.

At B204, a sentiment expressed by the part is depending on the formatting information, e.g. by one of the methods as discussed with respect to FIG. 1.

For example, as illustrated at B206, it may be determined whether the sentiment corresponds to a positive or negative feeling of the author with respect to the content of the part.

Further, as illustrated at B208, a strength of the sentiment of the part may be determined as discussed in the above.

Still further, a level of importance of the part may be determined based on the sentiment and/or the strength of the sentiment, as illustrated at B210.

At B212, the score is modified depending on a value assigned to the respective sentiment determined for the part of the text. For example, the value may be added or subtracted, depending on the feeling of the author being positive or negative. Thus, to sentiments reflecting a positive feeling of the author, a positive value may be assigned, while to sentiments corresponding to a negative feeling of the author, a negative value may be assigned. These values may optionally be weighted with weighting factors corresponding to the respective strength of the sentiment and/or to the level of importance of the part of the text. The score is then modified accordingly. Thus, the score is determined by determining a weighted sum of the respective sentiments of each of the plurality of parts, wherein a weight of a respective sentiment is determined based on a respective level of importance and/or on a respective strength of the respective sentiment.

At B214, a next part of the text is selected as the part to be analyzed, and the analysis is continued at B204.

When the end of the text is reached, the score related to the text is output at B216.

Thus, the embodiment of a method as illustrated in FIG. 2 may help a user to automatically analyze a text including formatting information with respect to an overall feeling of the author being positive or negative by an analysis which is carried out automatically by use of a microprocessor. The result of the analysis may be output as a score, or may optionally be coded in a manner visualizing the score, such as a color code (green for positive score, red for negative score and the yellow for intermediate score).

Figure 3:
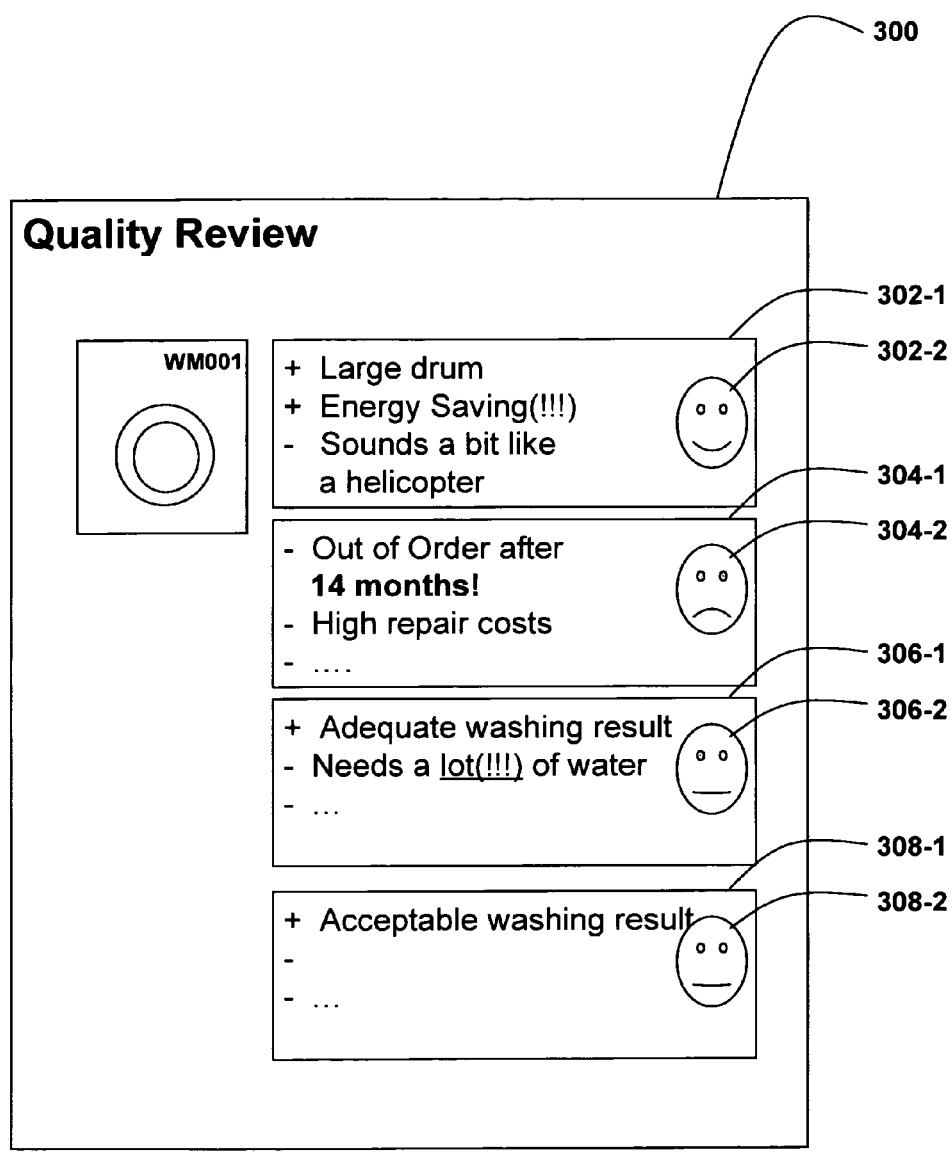
FIG. 3 illustrates an application of the method of FIG. 2 in a quality review website.

FIG. 3 illustrates an application of the embodiment illustrated in FIG. 2 in a quality review website application. With respect to this example, it may be assumed that a user visiting a website 300 is interested in a washing machine of type WM001 and would like to analyze customer reviews given with respect to this type of washing machine. Since within the internet, a large amount of information with respect to this washing machine may be available, it may be a tedious task for the user to search and evaluate this information by personal inspection. It should be noted that this information may include customer rankings assigning, for example, zero to five stars to a product, but also documents from user blogs or personal websites.

For analyzing this large amount of information, the user may use the embodiment of the method as illustrated in FIG. 2. This embodiment may help to establish a quick overall score for each of the published texts based on the formatting information used in the texts.

In the example, four documents 302-1, 304-1, 306-1, 308-1 have been analyzed and summarized by positive, negative or indifferent smileys 302-2, 304-2, 306-2, 308-2, respectively, visualizing the overall score automatically determined. Thus, the user may get a quick impression of the overall sentiment of each of the text and may then select some of the texts of particular interest for a further review.

It should be noted that in addition to visualizing the score, also the most important parts of documents 302-1, 304-1, 306-1, 308-1 have been determined and presented as catchwords summarizing the facts that have been judged as determinative for the overall opinion expressed within the text. Thus, the user is automatically supported in quickly getting an overview on texts collected e.g. from all over the internet.

Figure 4:
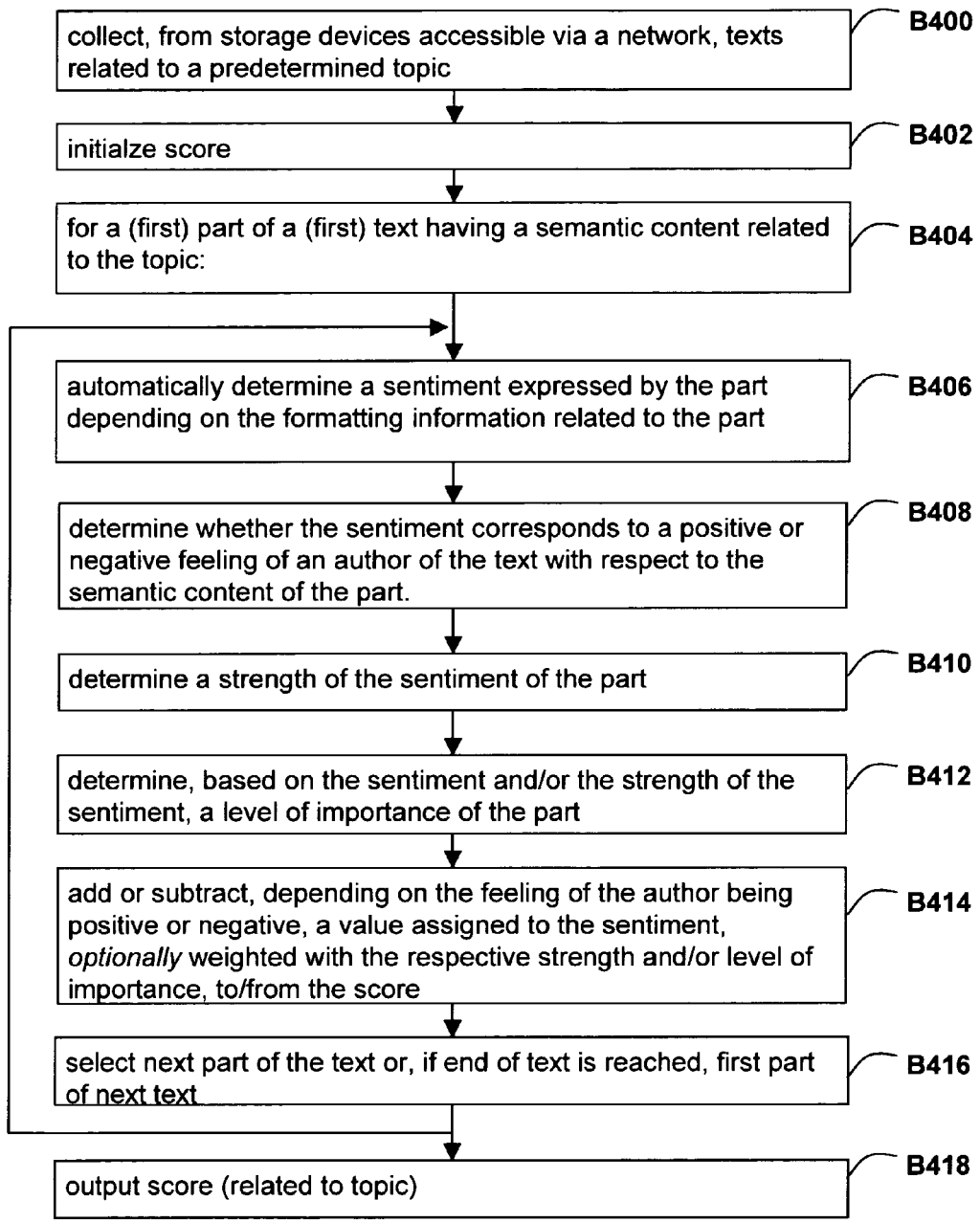
FIG. 4 illustrates a further embodiment of a method for determining a sentiment, wherein a score related to a topic is output.

In FIG. 4, a further embodiment of the method for determining a sentiment is illustrated. Within this embodiment, a semantic content of at least one of the parts of the text is determined, and the sentiment with respect to the semantic content is evaluated. It is illustrated that for a plurality of texts, a respective sentiment with respect to the semantic content may be evaluated for at least one respective part of each of the texts by using statistical methods.

At B400, texts related to a predetermined topic, e.g. a predetermined product or feature of a product, are collected from storage devices accessible via a network, e.g. the internet.

At B402, a score is initialized, e.g. with respect to the predetermined topic.

At B404, a first part of a first text having a semantic content related to the topic is determined.

At B406, a sentiment expressed by the part is automatically determined depending on formatting information related to the part. This may be carried out e.g. by using an embodiment of the method as depicted in FIG. 1.

At B408, it is determined whether a sentiment corresponds to a positive or negative feeling of an author of the text with respect to the semantic content of the part.

Further, the strength of the sentiment of the part is determined at B410.

At B412, a level of importance of the part is determined based on the sentiment and/or the strength of the sentiment.

At B414, a value is assigned to the sentiment, which value may then be added or subtracted from the score depending on the feeling of the author being positive or negative. Optionally, the value may be weighted with the respect strength and/or level of importance of the part. Thus, the score is updated by adding or subtracting the value assigned to the sentiment, optionally weighted with respect to the respective strength of the sentiment and/or level of importance of the text.

At B416, a next part of the text is selected, or, if an end of the text is reached, a first part of a next text. As long as a further part may be analyzed, the analysis continues at B406.

By iteration of blocks B406 to B416, a weighted sum of values assigned to the respective sentiments of parts of the text having semantic content related to the topic is determined. Within this sum, all parts of the texts having semantic content related to the topic are reflected, weighted with a respective strength of sentiment and/or level of importance.

The score may then be output at B418. It provides a brief numeric summary of the sentiments expressed within text with respect to the predetermined topic. The embodiment of the method thus allows an automatic analysis of any texts accessible in an electronic network with respect to the topic, and provides a brief overview on the analysis results.

Figure 5:
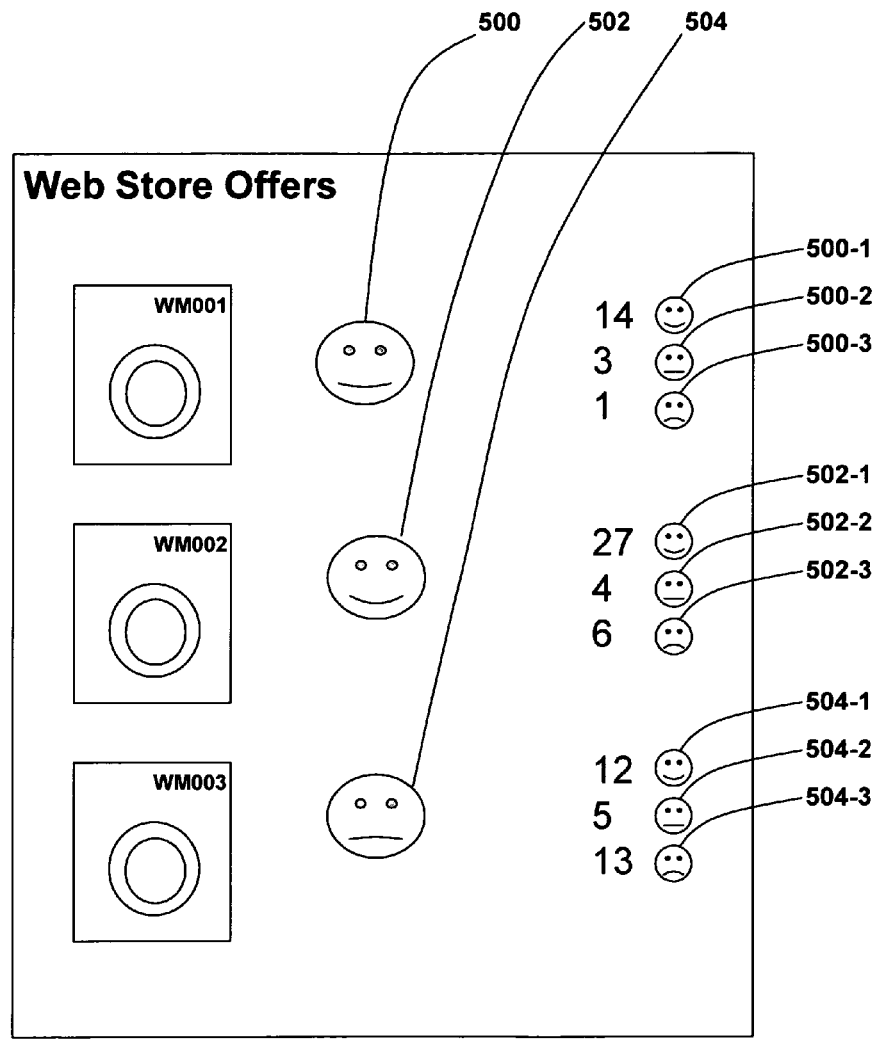
FIG. 5 illustrates an application of the method of FIG. 4 in a website including offers for purchases.

FIG. 5 illustrates an example of an application of the method depicted in FIG. 4. The example shows a website of a vendor offering washing machines WM001, WM002 and WM003. Each one of these washing machines may be used as the predetermined topic within the embodiment of the method illustrated in FIG. 4. Thus, any texts having a semantic content related to one of these products or to a feature of one of these products may be of interest. An electronic network, such as the internet, may be searched for corresponding texts, e.g. by analyzing blogs or customer reviews related to these topics.

According to the embodiment depicted in FIG. 4, for each of the washing machines WM001, WM002 and WM003, a score may be determined which reflects an overall opinion expressed within the texts related to the respective washing machine. This score may be automatically and efficiently determined by referring to the formatting information, as described in the above.

The result of the analysis may be visualized, e.g. by using positive, indifferent or negative smileys 500, 502, 504. Further, the overall score for each product may be broken down to items 500-1, 500-2, 500-3, . . . , 504-1, 504-2, 504-3 referring to the texts in which the respective positive, negative or neutral opinions are given. Catchwords of these texts may be accessed e.g. by a mouse click on one of the items 500-1, 500-2, 500-3, . . . , 504-1, 504-2, 504-3 to allow a more sophisticated analysis of each of the scanned documents, e.g. of the parts of the texts carrying formatting information, thus allowing a quick access of the respective texts to the user for a refined analysis.

Thus, the website provides an automatically generated overview on the sentiments expressed by means of formatting information within accessible texts with respect to a predetermined topic. Thus, the user is efficiently supported when carrying out a wide-spread search and sentiment analysis with respect to the predetermined topic.

Figure 6:
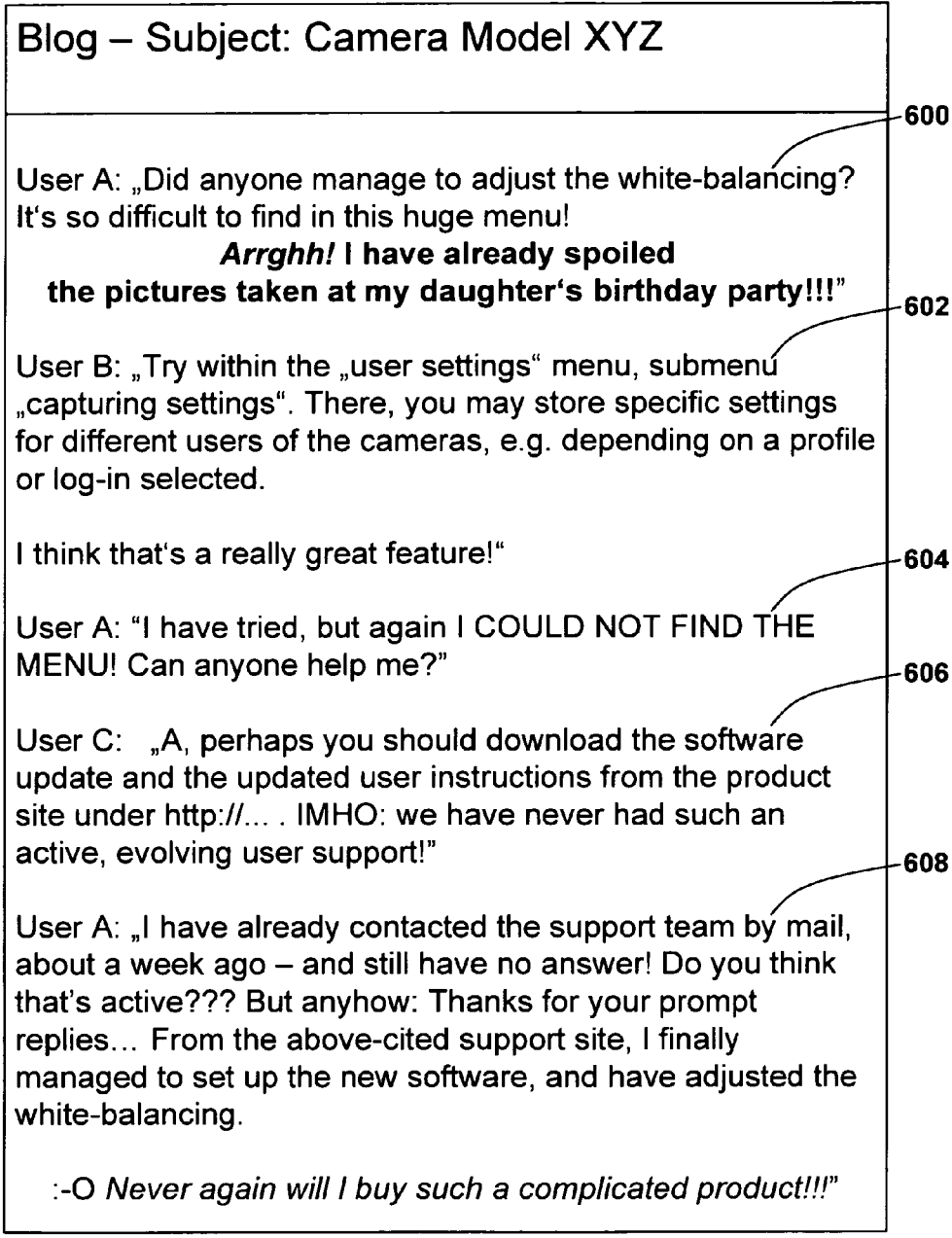
FIG. 6 illustrates a web blog from which sentiments can be analyzed by using formatting information.

In FIG. 6, a blog with respect to a camera model XYZ is illustrated. The blog includes formatting information and may thus be analyzed by one of the embodiments of the method as discussed in the above.

In a first contribution 600, user A questions a community for experiences related to the white-balancing of the camera. In a concluding paragraph, user A expresses his bad feelings with respect to the white-balancing. This paragraph may be easily identified within the blog since it is aligned in the center, typed in bold and introduced by an exclamation formatted in italics. Thus, the method as illustrated in FIG. 1 could easily identify this paragraph as carrying a strong sentiment with respect to the white-balancing of the camera model XYZ, and as having a high importance with respect to the overall subject of the contribution to the blog. A semantic analysis of the text may further allow to determine that the sentiment is negative (spoiled pictures).

The following contribution 602 of user B includes less formatting information. Anyhow, an analysis of the punctuation characters and of the paragraph organization allows identifying the last sentence as carrying the positive sentiment of a certain strength and importance to the contribution.

In the following contribution 604 of user A, a most important part of the text can easily be identified due to the capitalization of the characters. From this part, it may easily be read that the localization of the menu is the central problem of the blog.

In contribution 606, user C utters a suggestion and expresses his personal opinion, which may easily be identified since being introduced by the abbreviation "IMHO".

In the concluding contribution 608 of the questioning user A, the most important and sentiment-prone parts may again be identified by referring to the punctuation characters. Further, in the concluding paragraph, which is aligned in the center, printed in italics and further introduced by a shouting "emoticon", the opinion of user A is summarized and related to the complexity of the product.

In this example, formatting information may be used for identifying sentiment-prone and important parts of a text. Thus, an extraction of a sentiment based on formatting information may help to accurately and efficiently analyze texts, e.g. with respect to a predetermined topic.

In FIG. 7, a product evaluation of a camera model XYZ of is illustrated. The product evaluation includes three lists 700, 702 and 704, each of which is introduced by a headline reflecting the subject of each of the items of the list. Further, each list includes items headed by a positive (+) or negative (−) itemization character, outlining the opinion of the publisher. At the end of the product evaluation, an overall summary 706 is introduced by a symbol "→" followed by a bold-typed summarizing phrase. A detailed analysis of the product evaluation using, for example, the method depicted in FIG. 1 allows identifying features which the publisher found positive or negative.

If a large number of corresponding product evaluations is available e.g. with respect to the camera model XYZ, a detailed analysis of the customers' appreciation of the various features of this camera model may be carried out. For example, within each of the texts, important parts and sentiment-prone statements of the users may be indentified based on the formatting information. Then, a respective semantic content of the important parts and sentiment-prone statements may be analyzed. For example, as discussed with respect to B212, a value may be assigned to the parts, reflecting an opinion of the author. On this basis, a statistical analysis may be performed with respect to each feature, determining for example a mean value and a standard deviation of the values assigned to the opinions expressed within the texts. Thus, an automated statistical analysis of customer reviews may be performed, e.g. with respect to predetermined product or with respect to a feature of the predetermined product.

An evaluation result of a corresponding analysis is shown in FIG. 8. In the example, customer reviews 800 given on a German site of a vendor ABC and further customer reviews 802 given on a Japanese site of a vendor DEF are summarized and output for direct comparison. As predetermined topics, a laptop model XYZ and its keyboard, battery, cover and fan have been determined.

With respect to the keyboard, ten positive opinions were given on the German site of the vendor ABC, while only six positive feedback and eight negative feedbacks were given on the Japanese site of the vendor DEF. This may be an indication of a problem affecting only the Japanese keyboards, which may require a more detailed analysis of the feedbacks given.

When analyzing feedback, a different cultural background of the respective authors may be respected. Thus, the sentiment must be determined depending on a cultural background of an author of the text. For example, if the feedbacks on the Japanese site are analyzed, it should be kept in mind that often the last paragraph contains the actual intended meaning, while the beginning may include a polite introduction to the subject.

Further, phrases carrying sentiment may depend on a cultural background. For example, if in a feedback on a Japanese site, it is stated that something may be difficult, this can indicate serious problems, whereas the same statement in a feedback originating from an American or European background means that certain difficulties can potentially arise.

The evaluation result as shown in FIG. 8 may give rise to several different outcomes that may be considered.

For example, the negative feedback of the Japanese site of the vendor DEF may be reported to a product development department which, for a next generation model, will take care that all required functions are easily accessible. Further, a repair software may be provided by the product development department for download.

Further, a product distribution may be adapted with respect to the evaluation result. For example, the negative statements from the Japanese site of the vendor DEF may result in a product distribution rule ensuring that for the Japanese market, only a variation of the laptop model is distributed that is adapted to the corresponding needs.

Further, a supply chain management may be adapted in accordance with the results.

Still further, product evaluations including personal opinions may also be analyzed with respect to a single author. Thus, information may be gathered with respect to a personal profile of the author, describing his or her personal tastes.

For example, a user who is very positive about the various user settings of his camera may be provided with personal recommendations of other products, such as laptops or mobile phones, also allowing various user settings. Contrasting to this, a user complaining about his complicated product may receive recommendations of products with a simple user interface.

Thus, from an automatic evaluation of feedbacks of a user according to one of the embodiments of the method as described in the above, a profile of the user descriptive of his personal likings and tastes may be derived. Further, the user may be provided with personal recommendations corresponding to this profile.

Figure 9:
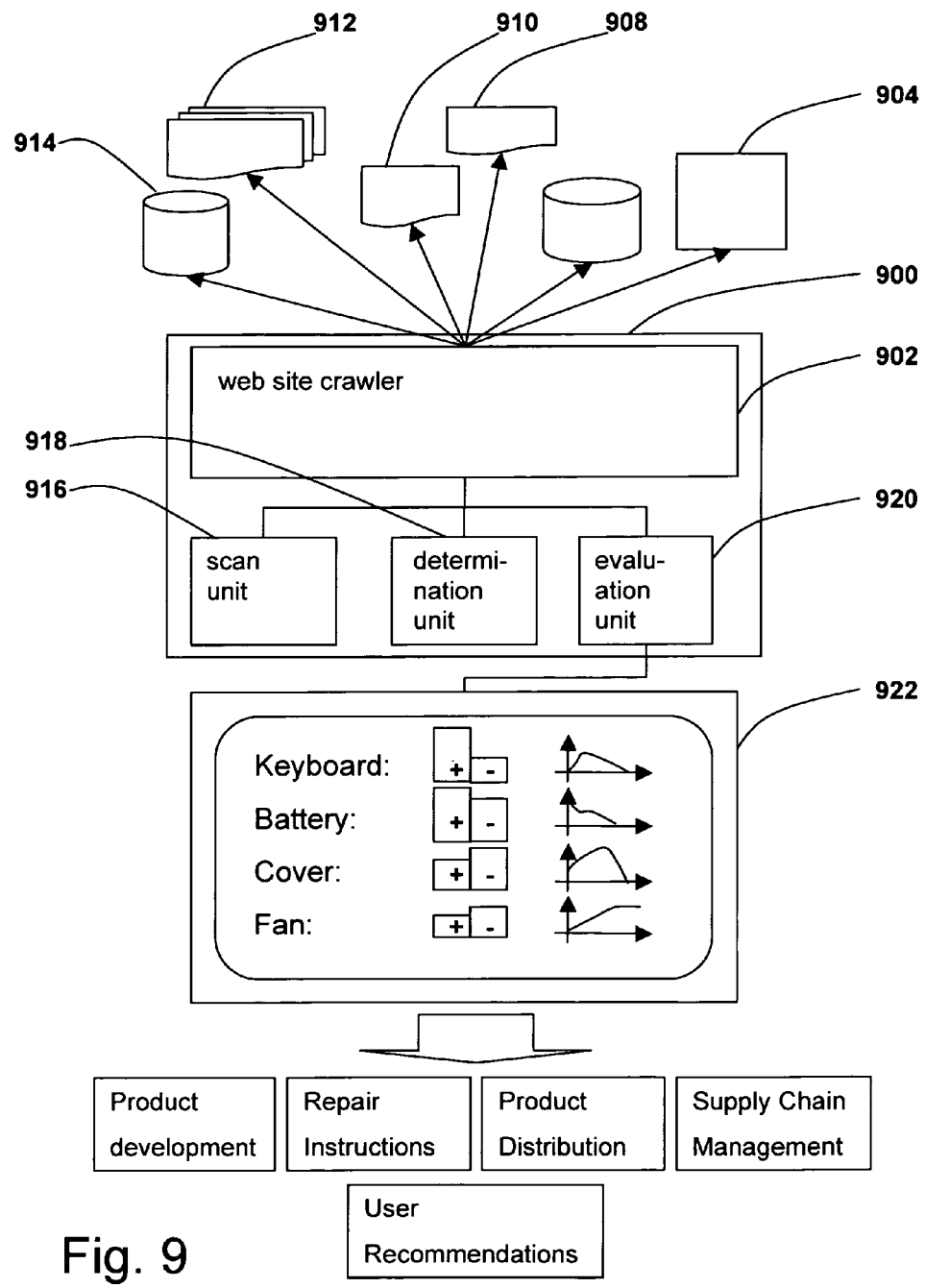
FIG. 9 illustrates an embodiment of a device for automatically determining a sentiment, providing output to a product development, to a product distribution, to a supply chain management and/or to a system for user recommendations.

In FIG. 9, a device 900 for automatic text evaluation, e.g. according to the embodiments illustrated in FIGS. 1, 2 and 4 is illustrated. Device 900 includes a website crawler 902 acting as a collection unit adapted to collect, from storage devices accessible via a network such as the internet, texts related to a predetermined topic. In the example depicted, website crawler 902 has access to a server 904, a first storage 906, documents 908 and 910, a database 912 including texts and a second storage 914. Thus, various kinds of texts including formatting information related to the predetermined topic may be accessed by a website crawler 902.

These texts may be provided to a scan unit 916 adapted to determine parts of the text including respective formatting information related to the parts of the text.

These parts may be provided to a determination unit 918, which is adapted to determine, for each of the parts of the texts, a respective sentiment and a respective semantic content, wherein the determination of the respective sentiment depends on the respective formatting information as determined by the scan unit 916. Determination unit 918 may determine the sentiment e.g. by the method as illustrated in FIG. 1.

The results of determination unit 918 may be provided to an evaluation unit 920, which is adapted to statistically evaluate, for each of the parts of the texts, the respective semantic content with respect to the respective sentiment, e.g. as discussed with respect to FIG. 8.

The results may then be displayed at a display 922. As illustrated, the results may be split with respect to different sub-topics, e.g. the keyboard, battery, color and fan of laptop model XYZ.

If the predetermined topic is related to a product or a feature of the product, further outcomes may be provided.

For example, it is possible that a technical feature of the product is adapted in accordance with one of the results. For example, a feature which was found to be poor, such as a battery capacity, may be improved according to the users' needs.

Further, also a means for reparing a malfunction of the product may be provided. For example, if a software release causes a malfunctioning e.g. of a menu, a repair release may be provided and distributed e.g. via a support website.

Further, a product distribution and/or a supply chain may be adapted in accordance with the results of evaluation unit 920. For example, if one of the vendors is particularly successful in selling a product, this vendor can be provided with larger amounts of items to be sold, and further with additional promotion material for awakening the interest of still further customers. If a product is particularly successful in a national market, the supply chain may be optimized such that vendors in this market are supplied with enough parts to be sold.

Further, the evaluation results may also be analyzed with respect to the author. In this case, the author is selected as the predetermined topic, and not a product. When evaluating the author's feedbacks to different products, valuable information about his likings may be grasped. Such information may be added e.g. to a personal profile of the author. As a consequence, personal recommendations e.g. of products that may be of interest for the author may be provided.

Thus, with the claimed methods and devices for automated text evaluation based on formatting information, it is possible to crawl and scan large amounts of texts, thereby quickly identifying parts describing the authors' sentiments and opinions. Thus, valuable information helping to develop, optimize and optimally distribute products in a market in accordance with the customers' needs may be gained. These analyses may be performed automatically and with reduced effort due to the referring to formatting information, which may help to accurately identify sentiment-prone and important passages of the texts.

The invention claimed is:

1. A method for determining a sentiment, comprising:
receiving or accessing, using a microprocessor, a text;
processing the received or accessed text and determining, from the text including formatting information related to parts of the text, a sentiment expressed by at least one of the parts, wherein
the sentiment is determined automatically using the microprocessor and is determined based on formatting information related to the at least one of the parts,
the determining of the sentiment is based on an analysis of an order of sentences in the text,
the formatting information includes at least one of an underlining, an italic printing, a color, a font style, and/or a font size of characters, for each of a plurality of the parts, a respective sentiment and a respective level of importance are determined by performing analysis of the text using the microprocessor, a score is generated depending on values assigned to the respective sentiments of the plurality of the parts of the text, the score being generated by determining a weighted sum of the respective sentiments of the plurality of the parts, a weight of a respective sentiment being determined based on a respective level of importance and/or on a respective strength of the respective sentiment, and the sentiment is determined depending on a cultural back-ground of an author of the text, by performing an analysis of particular information associated with the text including choice of words;

generating a visual indication associated with the score and the sentiment that is based on the formatting information, the order of sentences, and the cultural back-ground;

outputting the generated visual indication to a display; and in response to receiving or accessing a plurality of texts, evaluating, for the plurality of texts, a respective sentiment with respect to a semantic content of at least one respective part of each of the texts by using statistical methods.

2. The method according to claim 1, further comprising: determining whether the sentiment corresponds to a positive or negative feeling of the author of the text with respect to a semantic content of the at least one of the parts of the text.

3. The method according to claim 1, further comprising: determining a strength of the sentiment.

4. The method according to claim 1, further comprising: determining a semantic content of the at least one of the parts of the text; and evaluating the sentiment with respect to the semantic content.

5. The method according to claim 4, wherein the semantic content is related to a product or a feature of the product.

6. The method according to claim 1, wherein the formatting information includes at least one of a font type, a bold type, a paragraph alignment, a paragraph side margin, an itemization character, a punctuation character, an abbreviation for sentiment expression, a numbering, and/or a sequence of paragraphs used in the text.

7. A device for automated text evaluation, comprising: circuitry configured to receive or access from storage devices accessible via a network, texts related to a predetermined topic, process the received or accessed texts to determine parts of the texts including respective formatting information related to the parts of the texts, determine, for each of the parts of the texts, a respective sentiment and a respective semantic content, wherein the determination of the respective sentiment is based on the respective formatting information, based on an analysis of an order of sentences in the respective part of the texts, and based on a cultural back-ground of an author of a respective text, the cultural back-ground being associated with performing an analysis of particular information associated with the respective text including choice of words, and evaluate, for each of the parts of the texts, the respective semantic content with respect to the respective sentiment by using statistical methods, wherein the formatting information includes at least one of an underlining, an italic printing, a color, a font style, and/or a font size of characters, the circuitry is configured to generate a score depending on values assigned to the respective sentiments of the parts of the texts, the score being generated by determining a weighted sum of the respective sentiments of the parts of the texts, a weight of a respective sentiment being determined based on a respective level of importance and/or on a respective strength of the respective sentiment, the circuitry is configured to generate a visual indication associated with the score and the sentiment that is based on the formatting information, the order of sentences, and the cultural back-ground, and the circuitry is configured to output the generated visual indication to a display.

8. The device according to claim 7, wherein the predetermined topic is related to a product or a feature of the product.

9. The device according to claim 8, wherein the circuitry is configured to report a result of an evaluation to adapt a technical feature of the product in accordance with the result of the evaluation.

10. The device according to claim 8, wherein depending on a result of an evaluation, the circuitry is configured to report the result of the evaluation to a product development department to repair a malfunction of the product.

11. The device according to claim 7, wherein depending on a result of an evaluation, the circuitry is configured to report the result of the evaluation to adapt a product distribution and/or a supply chain.

12. The device according to claim 7, wherein a user profile of the author of the respective text is adapted in accordance with the result of the evaluation.

13. The device according to claim 12, wherein based on the adapted user profile, a recommendation is provided to the author.

14. The method according to claim 1, wherein the formatting information includes three or more of: a capitalization, the underlining, a font type, the font size, a bold type, an italic type, the color, a paragraph alignment, a paragraph side margin, an itemization character, an abbreviation for sentiment expression, a numbering, and/or a sequence of paragraphs used in the text.

15. The method according to claim 1, wherein the formatting information includes at least one of the underlining and the italic printing.

16. The method according to claim 1, wherein the formatting information includes three or more of: a capitalization, the underlining, a bold type, an italic type, a paragraph alignment, a paragraph side margin, an itemization character, an abbreviation for sentiment expression, a numbering, and/or a sequence of paragraphs used in the text.

* * * * *